United States Patent

Wehde

[11] 3,888,553
[45] June 10, 1975

[54] LEVITATED ROTARY MAGNETIC DEVICE

[75] Inventor: Heinz Wehde, Rothenberg, Germany

[73] Assignee: Teldix GmbH, Heidelberg, Germany

[22] Filed: July 25, 1974

[21] Appl. No.: 491,957

Related U.S. Application Data

[63] Continuation-in-part of Ser. No. 336,215, Feb. 27, 1973, Pat. No. 3,845,995.

[30] Foreign Application Priority Data

July 25, 1973 Germany.................. 2337696

[52] U.S. Cl. .................................................. 308/10
[51] Int. Cl. ............................................. F16c 39/06
[58] Field of Search ........ 308/10; 74/5.46; 310/154, 310/156, 263, 166, 12, 13; 324/151; 318/73, 259; 73/517 B, 490

[56] References Cited
UNITED STATES PATENTS

| | | | |
|---|---|---|---|
| 3,158,765 | 11/1964 | Polgreen | 310/12 |
| 3,243,238 | 3/1966 | Lyman | 308/10 |
| 3,462,666 | 8/1969 | Martinek | 308/10 X |
| 3,480,811 | 11/1969 | Grosbard | 308/10 X |
| 3,638,093 | 1/1972 | Ross | 310/12 X |
| 3,694,041 | 9/1972 | Studer | 308/10 |
| 3,698,775 | 10/1972 | Gilbert | 308/10 |
| 3,731,984 | 5/1973 | Habermann | 308/10 |

Primary Examiner—Mark O. Budd
Attorney, Agent, or Firm—Spencer & Kaye

[57] ABSTRACT

A rotational magnetic device, such as those used in flywheels, includes a stator and a rotor. A plurality of permanent magnets are mounted on the rotor, arranged around the circumference of the rotor and alternating in polarity along the circumferential direction. A plurality of windings are arranged on the stator within the magnetic field produced by the permanent magnets. Current which is supplied to these windings produces forces on the rotor which control the positioning and movement of the rotor. A plurality of further rings of magnets are mounted on the stator opposite the ring of permanent magnets to produce magnetic fields which impose selected forces on the rotor.

21 Claims, 2 Drawing Figures

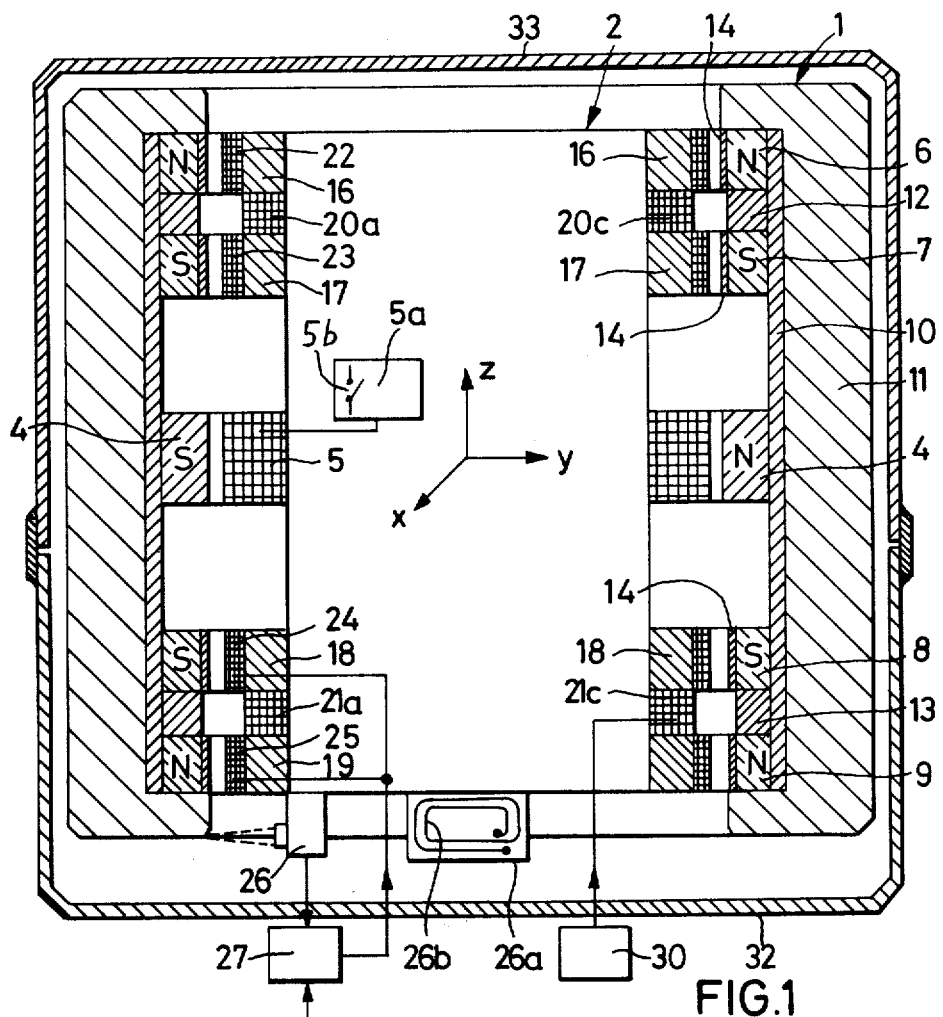
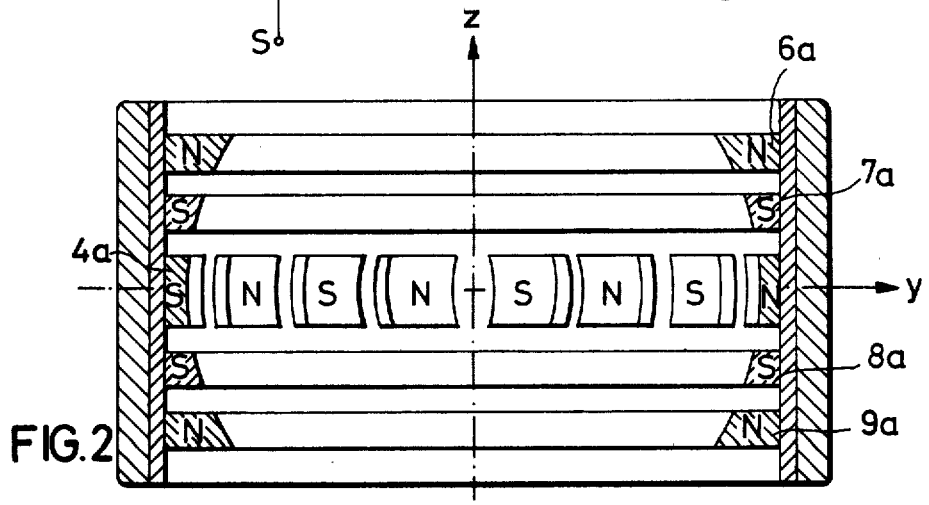

(54)

LEVITATED ROTARY MAGNETIC DEVICE

CROSS-REFERENCE TO RELATED APPLICATIONS

This is a continuation-in-part of copending application Ser. No. 336,215, filed Feb. 27, 1973 now Pat. No. 3,845,995 issued Nov. 5, 1974.

BACKGROUND OF THE INVENTION

The present invention relates to a magnetic device of the type including a stator, a rotor arranged to be rotatable with respect to the stator, and a plurality of permanent magnets.

In devices of the type under consideration, the permanent magnets are distributed in a ring about the rotor periphery and alternate in polarity in the peripheral direction. The magnetic field lines produced by these magnets extend, in first regions between adjacent magnets and between the rotor and stator, substantially parallel to the surface of the rotor and, in the second regions defined by the surfaces of the above-mentioned permanent magnets and between the rotor and stator, the magnetic field lines extend substantially perpendicular to the surface of the rotor.

The surface of the rotor may be coaxial with its axis of rotation or may be perpendicular to said axis or may be spherical, e.g. a sphere or conus. Opposite the above-mentioned permanent magnets a plurality of coil windings are disposed on the stator.

These windings are provided with groups of conductors which are distributed over the stator periphery and which are arranged substantially parallel to the rotor surface so that the magnetic field lines of the permanent magnets intersect these groups of conductors.

Moreover, these conductor groups are divided into first and second conductor groups; the first conductor groups extend substantially perpendicular to the field lines in the above-mentioned first regions and the second group of conductors extend perpendicular to the field lines of the second regions.

Current-generating means are provided on the stator and are connected with the windings to control the currents through the windings or groups of conductors in such a manner that forces in the axial, radial and tangential directions act on the rotor so that the rotor becomes freely suspended, and rotation about the axis of rotation is likewise assured. Such a magnetic device is disclosed in detail in the above-cited parent application.

With the above-mentioned device it is possible to mount the rotor so that it is freely suspended with respect to its three translational and rotational degrees of freedom, without there being any mechanical contact between rotor and stator. By means of suitable sensors to detect the position of the rotor with respect to the stator, and preferably with electronic control devices connected with current-generating means, it is possible to obtain an active position control for all degrees of freedom. It has been found that for certain applications, as for example in gas centrifuges and stabilizer flywheels for satellites, an active position control is not necessary for all degrees of freedom.

SUMMARY OF THE INVENTION

It is therefore an object of the present invention to improve a rotary magnetic device of the type described above in order to provide, with simple means, an optimum adaptation to the requirements of the intended use.

Related objects of the invention are to reduce the production and to increase the operating reliability of the device.

These and other objects according to the invention are achieved by providing a device of the type described above with magnetic rings on the stator opposite the ring of permanent magnets, the further rings producing magnetic fields which impose selected forces on the rotor.

With the device of the present invention the required control means are simplified in a manner involving low additional cost and with a relatively small increase in the size of the magnets and thus the operational dependability of the system is increased. Depending on the arrangement of the magnetic rings and/or windings, it is possible to obtain a passive position control, at least for one of the translational or rotational degrees of freedom of the rotor, to correspond to the particular requirements of the intended use.

Depending on the case at hand and the design of the rotor, the magnetic rings may be disposed on cylindrical surfaces, conical surfaces, spherical surfaces or on a surface which is perpendicular to the axis of rotation of the rotor. Due to the arrangement of at least two permanent magnet rings next to one another with opposite polarity, it is possible in an advantageous manner to provide a magnetic flux return path and thus to attain a high magnetic induction in the air gap between rotor and stator.

According to a very advantageous embodiment, two groups of magnetic rings are disposed adjacent the outer ends of the rotor to produce a passive position control about the two axes which are perpendicular to the rotor axis, i.e. a doubly passive control with respect to rotational movements, as well as a passive position control in the direction of the two last-mentioned axes, i.e. doubly passive control with respect to translational movements, with a minimum of magnetic volume. Since the magnetic rings which are disposed opposite the rotor magnetic rings on the stator and/or the current-carrying windings always have the same polarity and since the rotor is in an unstable weight position in the direction of its axis of rotation, it is held in this position under active control by the windings in the partial radial field of the magnetic rings which include known control devices.

According to an embodiment of the present invention which is of particular advantage with respect to the dynamic behavior of the rotor, the stator windings through which current flows serve to produce a magnetic field so that in cooperation with the corresponding magnetic rings of the rotor it is possible to attain a passive position control. In order to effectively attenuate possibly occurring resonance effects in the passive control circuits, it is very advantageous to short-circuit sections of the windings. This can be accomplished by a very low or even negative internal resistance in the excitation voltage path. Due to the settability of the internal resistance, the attenuation can be easily adapted to the resonant behavior of the rotor. Thus, in an advantageous manner, the effective magnetic forces are increased when the air gap is reduced, or reduced when the air gap is increased, so that the passive position control is substantially more rigid with only slightly more electronic circuitry required and while maintaining the size of the magnets.

By another preferred embodiment, it is possible to convert the rotary energy stored in the rotor back to electrical energy. If embodiments of the invention are disposed, for example, in an approximate vacuum, an arrangement is produced for the practically loss-free storage and recovery of energy. It is thus possible to store even very large quantities of energy in a manner favorable to the environment, and particularly in a stationary condition on the ground.

BRIEF DESCRIPTION OF THE DRAWINGS

FIG. 1 is a longitudinal, cross-sectional view of an embodiment of the invention having a rotor extending in the axial direction and passively mounted in the directions along and about the axes perpendicular to the axis of rotation and about said axes.

FIG. 2 is a schematic cross-sectional view of a rotor according to the invention with magnetic rings whose surfaces are spherical.

DESCRIPTION OF THE PREFERRED EMBODIMENTS

FIG. 1 shows a magnetic device including a cylindrical rotor 1 which is mounted to be rotatable about axis $z$ relative to stator 2. Permanent magnets 4 are provided on the rotor 1 to drive it and are oriented to alternate in polarity around the periphery of the device. Current-generating means 5a and the stator windings 5 exert forces on the rotor in the peripheral, or tangential, direction, whose position with respect to the stator is determined in a known manner. The stator windings 5 can also produce forces in the direction of the $x$ or $y$ axis. The form of windings 5 and means 5a and the manner in which these produce such forces are fully described in the parent application. Instead of this drive means which, in principle, has the form of a brushless direct current motor, it is also possible to use some other known drive means.

At the outer ends of rotor 1, taken along the z axis, two closed magnetic rings 6, 7 and 8, 9 are provided in pairs, one pair at each rotor end, which rings are radially magnetized so that their radially inwardly directed pole surfaces are the north poles (N) or south poles (S), respectively. The provision of pairs of rings is particularly desirable when the axial length of the rotor is greater than one-half its radius. In FIG. 1, the symbols indicate the polarity of the inwardly directed pole faces of each ring and the rings of each pair of respectively opposite polarity pole faces.

The rotor 1 also includes on the rear side of the magnetic rings 6-9 a magnetic flux return path ring 10 of wound steel tape. This ring 10 constitutes part of the working load of the rotor and is itself wound with a layer 11 of carbon fibers so that the rotor becomes extremely hard.

Between the magnetic rings of each pair 6, 7 and 8, 9 a respective short-circuit ring 12 or 13 of electrically highly conductive material is provided. The pole surfaces of the magnetic rings 6–9 are covered on the inside with a layer 14 of a material with a higher permeability than that of the rings in order to produce a substantially interference-free magnetic field in the active air gap between rotor 1 and stator 2.

Opposite the magnetic rings of the rotor, closed magnetic rings 16–19 are provided on the stator and these rings may also be radially magnetized permanent magnets. In the present embodiment, however, current-carrying windings 20, 21 are provided and current is caused to flow therethrough in directions such that the poles of the rotor and stator magnetic rings which face one another are to have the same polarity. The magnetic rings of the stator are enclosed, adjacent their radially outer surfaces, by respective annular windings 22–25 with which, together with sensors 26 for movement of the rotor 1 in the z direction and control device 27, the rotor 1 is actively stabilized in the z direction, as will be described below. When inductive or capacitive sensors are used it is very advisable to have their effective width, i.e. around the periphery of the stator, extend over at least one quadrant in order to suppress interfering signals.

Each one of the above-mentioned windings 20 and 21 is divided in the peripheral direction into four identical segments which are provided with current by a total of eight amplifiers 30 whose final stages are provided with a negative internal resistance.

As already mentioned, the direction of current in windings 20 and 21 is selected so that the polarities of the radially outer surfaces of adjacent ones of the magnetic rings 16–19 are respectively opposite, in the same manner as the permanent magnetic rings 6–9 of the rotor 1. Thus forces become active on the rotor which are uniformly distributed around the periphery and which are directed radially outwardly, so that the position of the rotor 1 in the direction of the $x$ and $y$ axis is passively regulated. Due to the symmetrical arrangement of the pairs of magnetic rings 6, 7 and 8, 9 with respect to the $x$ and $y$ axes, the rotor 1 is also passively controlled with respect to rotation about those axes.

The effect of the thus achieved four passive regulations is substantially increased by the above-mentioned division of the windings 20 and 21 into four segments each, and by the negative resistance in the final stages 30. If, for example, the rotor 1 is turned about the x axis, voltages are induced in the winding segments 20a and 21a which voltages are practically short-circuited due to the negative internal resistances of the associated final stages. Thus there is produced a moment about the $x$ axis which acts counter to the initial movement so that the passive position control is very rigid in its effect without requiring a particularly large magnetic volume.

As can easily be demonstrated, due to the always identical polarity of oppositely disposed magnetic rings on the stator and rotor, the rotor is in an unstable equilibrium with respect to movements in the direction of the z axis. The rotor is thus actively stabilized by means of annular windings 22 to 25 and the corresponding sensors 26 as well as control and amplifier devices 27. If, for example, the rotor 1 moves upwardly in the direction of the z axis, sensor 26 which is designed as a known optical, inductive or capacitive sensor, furnishes a signal. Via control device 27 which also receives a rated value signal s, the currents flowing through annular windings 24, 25 are influenced in such a manner that a force counter to the initial movement acts on the rotor and forces the rotor back into its illustrated position.

The annular windings 22 to 25 are disposed coaxially to the z axis and were intersected by the radially directed magnetic field lines of the magnetic rings 6 to 9. If a current is flowing through said windings forces are caused in the axial direction. The windings 24, 25 are connected in parallel with the amplifier device 27, and their winding sense is opposite to another for getting forces in the same direction. The windings 22 and 23 may be connected with said amplifier device 27 or with an other amplifier in the same manner.

Thus, for example, an inductive sensor 26a including windings 26b can be mounted on the stator so that windings 26b extend in the peripheral direction over a given winding region. Thus interfering signals which may occur for example as a result of asymmetries in the rotor if small area points of the rotor base were scanned are substantially suppressed. The parts of the rotor opposite the sensor windings are in this embodiment made of a ferromagnetic material.

FIG. 2 shows a rotor which in principle corresponds to the rotor of FIG. 1, and in which the surfaces of the annular permanent magnets 4a which have alternating polarity in the peripheral direction and the surfaces of the magnetic rings 6a, 7a, 8a, 9a lie on a common spherical surface. The stator is designed in a corresponding manner and the windings, the current generating means and the amplifiers and control devices are constructed and operate in the same manner as in the embodiment of FIG. 1.

The embodiment illustrated in FIG. 1 has a total of four passive position controls, corresponding to translation in the x and y directions and rotation about the y and x axes. One skilled in the art would readily understand how to select other combinations of active and passive position controls, depending on the intended use. Thus, for example, with an appropriate configuration for the stator windings 5 in the region of the permanent magnets 4 of the rotor, and by suitable control of these windings 5, additional forces can be produced to act on the rotor in the x and y directions. Also the rotor can be designed as an internal rotor.

It has been found to be very advisable to design the current-generating means 5a in such a manner that when the magnetic device is operated as a generator, the rotational energy of the rotor can be reconverted to electrical energy. For this a switching device 5b ist provided in the current generating means, for switching off the windings 5 from the power supply provided in said current generating means also. There is produced a voltage in the winding 5 by the rotating permanent magnets 4 of the rotor, and said voltage can be used for supplying any load when the power supply is switched off by said switching device 5b.

It is also advisable to enclose the entire device with a pressure-tight housing, including, for example, two half-shells 32, 33, which are connected together in a suitable manner. If the pressure within the housing is reduced to such an extent that it becomes substantially less than atmospheric, or if a gas is introduced into the housing with a specific weight which is low compared to air, then current losses between the rotor and stator are greatly reduced and a favorable degree of efficiency is obtained for the magnetic device.

With the device of the present invention it is also possible, in a very advantageous manner, to adapt the bearing forces to external operational conditions. If, for example, during the starting phase of a spacecraft, high deceleration forces are to be encountered by the rotor 1 in the direction of the z axis, an appropriate rated value s increases the currents in windings 24, 25 via control devices 27 so that corresponding magnetic forces act on the rotor counter to the decelerating forces. Upon completion of the starting phase a reduction of the rated value s will also reduce the above-mentioned currents and thus the energy input of the magnetic device.

In particular, suitable design of the control devices optimizes the dynamic behavior of the magnetic device so that load peaks as a result of excess oscillations can be effectively attenuated. In the same manner the forces in the passive position controls can be adapted to the external stresses by controlling the currents in windings 20 and 21.

In summary the complete control system of the embodiement of FIG. 1 function as follows. The pairs of magnetic rings 6, 7 and 8, 9 of the rotor cause together with the stator magnetic rings 16 to 19 a passive position control in the directions of the x and z axes. Since said magnetic rings are arranged symmetrically with respect to the x and z axes, the rotor is also passively controlled with respect to rotation about those axes. Said passive position controls are characterized in using not any position sensors for controlling the rotors position. For increasing the effect of said passive position controls when electro magnets are used on the stator forming the magnetic rings 16 to 17, the windings 20 and 21 are divided into four segments.

Furthermore each one of said segments are provided with direct current by an amplifier 30 with a low positive or a negative internal resistance preferrably. Thus when the rotor is for example turned about the x axis, the voltages induced in the winding segments 20a and 21a are practically short-circuited due to the low positive or negative internal resistance of the connected amplifiers and said initial turning is damped. Furthermore an active position control with respect to movements along the z axis is achieved by the position sensor 26 the connected amplifier device 27 and anular windings 24 to 25 as written above. The movements about the z axis are controlled by the current generating means 5a and the winding 5 for example likewise a well known brushless direct current motor.

It will be understood that the above description of the present invention is susceptible to various modifications, changes and adaptations, and the same are intended to be comprehended within the meaning and range of equivalents of the appended claims.

I claim:
1. A magnetic device comprising, in combination:
a stator;
a rotor disposed for rotation relative to said stator;
a plurality of permanent magnets mounted on, and spaced around the circumference of, said rotor to be in the form of a ring with the magnets alternating in polarity around said rotor circumference in a manner such that the magnetic field lines extend substantially parallel to a surface of said rotor between said rotor and said stator in regions between adjacent magnets and extend substantially perpendicular to such rotor surface in the region of each magnet; a plurality of windings disposed on said stator and distributed around the circumference of said stator and intersected by said field lines; current generating means connected to said windings for providing currents in said windings which create forces acting on the rotor in the axial, radial and tangential directions, relative to the direction of rotor rotation; and a plurality of annular magnetic rings mounted on said stator for producing magnetic forces which act on said rotor.

2. A device as defined in claim 1 further comprising a plurality of annular magnetic rings on said rotor opposite said magnetic rings on said stator, with the magnetic forces which act on said rotor being effective between said rings on said stator and said rings on said rotor.

3. A device as defined in claim 2 wherein said plurality of permanent magnets and said annular magnetic rings present surfaces which are disposed substantially coaxially with the axis of rotation of said rotor.

4. A device as defined in claim 2 wherein said plurality of permanent magnets and said annular magnetic rings present surfaces having the form of portions of the surface of a sphere.

5. A device as defined in claim 2 wherein said magnetic rings on said rotor are permanent magnets and adjacent ones thereof have respectively opposite polarity orientations.

6. A device as defined in claim 5 further comprising a steel ring defining a magnetic flux return path mounted on said rotor and contacting the sides of said permanent magnets and of said rings on said rotor which face away from said stator.

7. A device as defined in claim 6 wherein said rotor further comprises a layer of plastic bound carbon fibers wound on said steel ring.

8. A device as defined in claim 2 further comprising additional windings on said stator opposite said magnetic rings on said rotor and arranged to receive currents to actively stabilize said rotor with respect to selected degrees of freedom.

9. A device as defined in claim 2 wherein said rotor has an axial length which is greater tha one half its radius and said magnetic rings on said rotor include at least two substantially radially magnetized groups of magnetic rings, each group being located at a respective end of said rotor, and further comprising: annular windings mounted on said stator, at that side of said magnetic rings on said stator which is directed toward said rotor; and sensors arranged to detect axial movement of said rotor; output and control devices connected between said sensors and said annular windings for causing the output signals from said sensors to create currents in said annular windings for the active stabilization of said rotor in the axial direction.

10. A device as defined in claim 9, wherein said permanent magnets mounted on said rotor are located axially between said magnetic ring groups, and the current through said windings on said stator are such as to produce forces in the tangential direction and in the radial direction.

11. A device as defined in claim 9 wherein there is a plurality of said annular windings distributed about the periphery of said device and said control devices include final stages connected to said annular windings and provided with an adjustable positive or negative internal resistance.

12. A device as defined in claim 2 wherein each of said magnetic rings on said rotor is provided, at the surface facing said stator, with a layer of a material having a high permeability.

13. A device as defined in claim 2 wherein each of said magnetic rings of said rotor is provided, at the surface facing said stator, with a layer of an electrically highly conductive material.

14. A device as defined in claim 13, further comprising a ring of electrically highly conductive material disposed between two adjacent magnetic rings on said rotor.

15. A device as defined in claim 2 wherein said magnetic rings on said rotor are made of a material having poor electrical conductivity.

16. A device as defined in claim 15 wherein said material having poor electrical conductivity is pressed metal oxide powder.

17. A device as defined in claim 15 wherein those of said stator windings which generate forces that act on the rotor in the tangential direction, and said current-generating means connected with those windings are designed so that, when said device is operated as a generator, at least part of the energy stored in the rotating rotor is reconverted to electrical energy.

18. A device as defined in claim 17 further comprising a pressure-tight housing enclosing said rotor and stator.

19. A device as defined in claim 18 wherein the pressure within said housing is substantially less than atmospheric.

20. A device as defined in claim 18 further comprising a gas having a specific weight less than that of air and filling the interior of said housing.

21. A device as defined in claim 2 further comprising sensors for active position control extending over a given angular distance in the peripheral direction of said stator in order to suppress interfering signals.

* * * * *